US006970630B2

(12) United States Patent
Sigel, Jr. et al.

(10) Patent No.: US 6,970,630 B2
(45) Date of Patent: Nov. 29, 2005

(54) FIBER OPTIC CABLE AND PROCESS FOR MANUFACTURING

(75) Inventors: George H. Sigel, Jr., Stockton, NJ (US); Daniel S. Homa, Bloomsbury, NJ (US)

(73) Assignee: Rutgers, The State University of New Jersey, New Brunswick, NJ (US)

( * ) Notice: Subject to any disclaimer, the term of this patent is extended or adjusted under 35 U.S.C. 154(b) by 378 days.

(21) Appl. No.: 10/154,572

(22) Filed: May 23, 2002

(65) Prior Publication Data

US 2003/0217569 A1 Nov. 27, 2003

(51) Int. Cl.[7] .................................................. G02B 6/02
(52) U.S. Cl. ...................................................... 385/123
(58) Field of Search ................................. 385/123–128

(56) References Cited

U.S. PATENT DOCUMENTS 3,852,079 A * 12/1974 Davis .......................... 501/35
4,277,270 A * 7/1981 Krohn ......................... 65/404
4,666,247 A 5/1987 Machesney et al. ..... 350/96.34
4,709,987 A * 12/1987 Blackburn et al. .......... 385/141
4,787,927 A 11/1988 Mears et al. ................. 65/3.12
5,407,872 A * 4/1995 Komori et al. ............... 501/35
6,416,235 B1 * 7/2002 Rabinovich .................. 385/78
6,792,187 B2 * 9/2004 Andrus et al. ............. 385/123

OTHER PUBLICATIONS

Lines, et al., "Calcium Aluminate Glasses as Potential Ultralow–Loss Optical Materials at 1.5–1.9 Microns," Journal of Non–Crystalline Solids, vol. 107, pp. 251–260, 1989.
Poole, et al., "Fabrication and Characterization of Low–Loss Optical Fibers Containing Rare–Earth Ions," Journal of Lightware Technology, vol. LT–4, No. 7, pp. 870–876, 1986.
Snitzer, et al., "Fabrication of High Concentration Rare–Earth Doped Optical Fibers Using Chelates," Journal of Lightware Technology, vol. 2, No. 11, pp. 1680–1683, 1990.

* cited by examiner

*Primary Examiner*—Akm Enayet Ullah
*Assistant Examiner*—Jerry T. Rahill
(74) *Attorney, Agent, or Firm*—McCarter & English, LLP

(57) ABSTRACT

A preform for a low loss fiber optic cable and method and apparatus for fabricating such a preform is provided. The method includes providing $AlCl_3$ and CVD precursors and locally doping $CaCl_3$. Alkali and/or alkaline earth fluxing agents can be introduced. The alkali and/or alkaline earths are doped along with the aluminum into the silica glass core.

18 Claims, 8 Drawing Sheets

FIBER OPTIC CABLE AND PROCESS FOR MANUFACTURING

BACKGROUND OF THE INVENTION

1. Field of the Invention

The present invention relates to glass transmissivity and particularly to fiber optic cables having reduced transmission loss.

2. Related Art

Fiber optic cable is a well known media for transmission of an optical signal from a source of the optical signal to a receiver for that signal. One of the most important applications of fiber optic technology is in the long-haul transmission of communications signals, where an electrical (usually digital) signal from a communications signal source (e.g., telephone or data modem) is modulated onto a light wave and transported via a fiber optic connection to a receiver (where the electrical signal is recovered through a demodulation process).

A critical factor in communications applications of fiber optic technology is the attenuation or loss characteristic of the fiber optic cable used as the transmission medium. As is well known, signals transmitted via a fiber optic channel are attenuated as they travel along the channel, and at some distance from the signal source reach a sufficiently low level as to require amplification by a "repeater" inserted in the fiber channel at that point. Thus, the loss characteristic of the fiber optic cable is directly related to the distance between repeaters for the fiber optic channel.

It is generally desirable to minimize the number of repeaters in a fiber optic channel and correspondingly to maximize the length of the sections of fiber optic cable between each set of repeaters. To that end, the attenuation or loss characteristic of the fiber optic cable for a desired band of optical signals is also desirably minimized.

The technology of the current art for fabrication of fiber optic cable is based on germanium (Ge) doped silica (Si). The losses in current-technology fiber optic cables are on the order of 0.16 db/kilometer, which is essentially the theoretical maximum transparency of silica. Thus it would be advantageous to produce a lower loss fiber which would permit longer fiber links between repeaters.

OBJECTS AND SUMMARY OF THE INVENTION

It is a primary object of the present invention to provide a fiber optic cable having attenuation at a nominal communications frequency lower than that achievable with prior-art fiber optic cables. To that end, a new glass composition is disclosed, along with a method for fabricating such a glass composition into a fiber optic cable, that provides a low loss cable. In particular, based on the understanding that attenuation in a fiber optic cable is a function of scattering losses in the optical material, a fiber optic cable fabricated according to the method of the invention exhibits low scattering losses.

The low scattering loss for the fiber of the invention results from an effort by the inventors to reduce glass processing temperatures by introduction of alkali and/or alkaline earth fluxing agents to thereby reduce the intrinsic Rayleigh scattering of the glass—that Rayleigh scattering being the major limitation upon the intrinsic transparency of optical fibers. To achieve this objective, fiber-optic preforms of alkali, alkaline earth and aluminum doped silica were prepared using various precursors and vapor delivery techniques, with the result that doped silica preforms, and fibers drawn therefrom, are achieved with lower scattering losses than present generation commercial optical fibers.

In a preferred embodiment of the invention, the new glass compositions of the invention are synthesized via the modified chemical vapor deposition (MCVD) process.

The glass preforms fabricated according to the invention contain new glass compositions in the core region that guide the light within a fiber. Alkali and/or alkaline earths are doped along with aluminum into the silica glass core in place of present-day Ge-doped silica. The fiber compositions of the invention possess lower fictive and glass transition temperatures and exhibit lower intrinsic scattering of light signals. In addition, the spatial stability and non-volatility of the aluminum/alkaline earth dopants in the silica matrix during preform collapse and subsequent fiber drawing offer unique opportunities for fabrication of fibers with precision refractive index profiles. Further, the new host compositions may offer superior solubility and performance for rare earth dopants such as erbium, as well as superior photosensitivity of long wavelengths for fabrication of Bragg grating devices.

BRIEF DESCRIPTION OF THE DRAWINGS

Other important objects and features of the invention will be apparent from the following Detailed Description of the Invention taken in connection with the accompanying drawings in which.

DETAILED DESCRIPTION OF THE INVENTION

The structure of an optical fiber consists of an inner core, a cladding surrounding the core and a protective buffer coating. The core is the area through which light travels and the information is carried. In conventional fiber optic cables, the core is fabricated from a silica glass doped with impurities like Boron and Germanium to change the refractive index inside the glass. The cladding is also made of glass but has a lower refractive index than the core. The lower refractive index causes the light in the core to reflect off of the cladding and stay contained in the core. To protect the fiber core and the cladding, several layers of plastic coatings are applied to preserve strength.

Optical fibers are made by chemical processes. The critical feature of an optical fiber that allows it to propagate light down its length is a core of high refractive index surrounded by a cladding of lower index. The higher index core of conventional fiber cables is produced by doping silica with oxides of germanium or the like. Although there are multiple processes used for manufacturing the glass preform from which a fiber optic cable is drawn, a particularly useful such process is the modified chemical vapor deposition (MCVD) process. The MCVD process is well known in the art and need not be further described here. It is noted, however, that in a preferred embodiment, the fiber optic cable of the invention is fabricated using the MCVD process.

Figure 1:
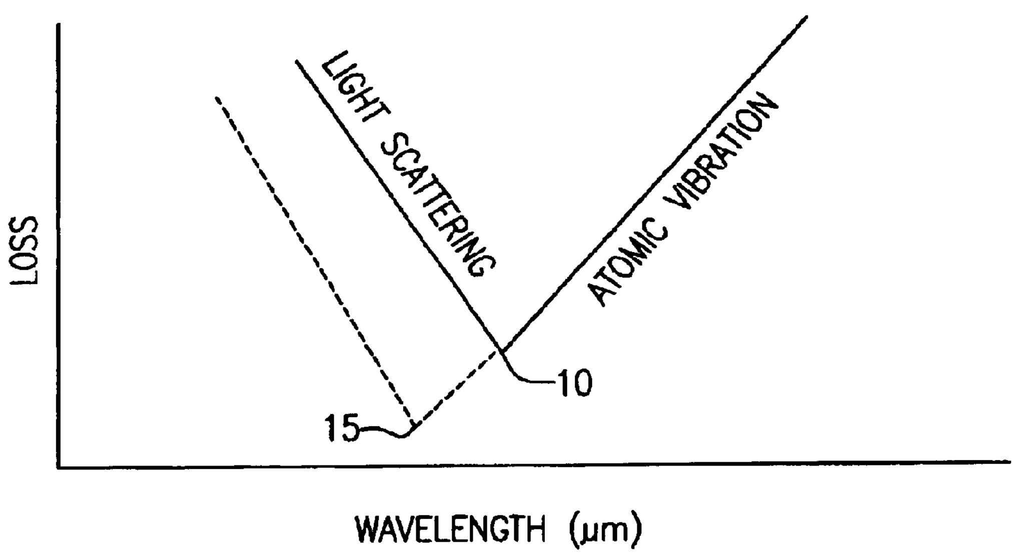
FIG. 1 provides an illustrative depiction of light scattering and atomic vibration loss curves.

With any optical material, there are two fundamental mechanisms that control optical loss in the light path—light scattering and atomic vibration. If light is shined into an optical path, some portion of the light scatters—i.e., it is deflected out of the optical path. Atomic vibration is the resonance that takes place as a function of material composition and how it is bonded, and also introduces some loss characteristic to the optical material. The intersection of the light scattering and atomic vibration curves is the loss minimum for the optical material. An exemplary plot of those two curves is shown in FIG. 1, illustrating the "V" shape formed by the intersection of those curves. For silica, that loss minimum has been reached at 1.55 microns, depicted at 10. Because of the $SiO_2$ content of the silica-based fibers, the atomic vibration curves will remain substantially fixed. However, a reduction of the light scattering loss curve for the material, illustrated by the dashed line in FIG. 1, will move the point of intersection between those curves to a lower point, depicted at 15, and thus lower the loss minimum for the material.

The light scattering mechanism described above, which constitutes a primary loss mechanism limiting the theoretical transparency of $SiO_2$, is characterized as Rayleigh scattering of the glass. It is known that a reduction of the Rayleigh scattering of oxide glasses can be achieved by reducing the fictive temperature—i.e., the temperature at which a cooling glass becomes a rigid network. Studies in the art have suggested that Rayleigh scattering in glass can be potentially reduced (10–25%) through the addition of various alkali and alkaline earth dopants. Among the suggested alkali doped silica glasses, a composition of $Na_2O$—$Al_2O_3$—$SiO_2$ has received perhaps the most attention as the best candidate for an ultra-low loss glass composition.

The current multicomponent oxide glasses fabricated via the crucible melts and conventional starting materials typically possess high levels of impurities such as transition metals and water, which are unacceptable in fiber optic materials. However, the modified chemical vapor deposition (MCVD) process currently employed in the synthesis of fiber optic silica glass offers the high purity essential in long haul communication applications. The MCVD process also provides the species confinement not available during outside vapor deposition (OVD) collapse.

The inventors have applied a variation of the MCVD process to the fabrication of $Na_2O$—$Al_2O_3$—$SiO_2$ glass composition in an effort to achieve the ultra-low loss glass hypothesized by the prior studies. Although fiber preforms have been fabricated by the inventors using that composition that show promise for reduced Rayleigh scattering, fibers drawn therefrom did not produce the expected advantage in improved loss characteristic. It is believed that future advances in fabrication technology will yield such an advantageous loss characteristic with the inventors methodology applied to this glass composition.

As a result of the experience with the Ca—Al—Si composition, the inventors turned their attention to an alkaline earth glass composition, $CaO$—$Al_2O_3$—$SiO_2$. It is known that the co-doping of aluminum serves to suppress the tendency of $CaO$—$SiO_2$ glasses to devitrify during glass processing. To that end the $AlCl_3$ delivery flow rates in the inventors' methodology were varied in a systematic manner to develop an array of glasses with different Ca/Al ratios. The inventors considered numerous $CaCl_2$ precursors and delivery modifications in their efforts to develop the most efficient and controllable delivery method. In furtherance of their fabrication methodology, the inventors also developed and constructed a local delivery apparatus that is an upscale modification of the dopant chamber technique. From these efforts the inventors have developed fiber preforms, and fiber cables drawn therefrom, having demonstrable low loss characteristics. In the following sections, the inventors describe and disclose the particulars of their methodology, and of the fibers fabricated therefrom.

I. Sodium Aluminosilicate Glasses

In the effort to develop an ultra-low loss fiber based on a sodium aluminosilicate composition, the inventors initially focused on the determination of an appropriate sodium precursor material and delivery approach that was compatible with the current MCVD process. The fabrication of glasses via the MCVD process provides severe limitations on the available precursor materials. The high purity precursor material must maintain adequate vapor pressures compatible with the MCVD process. Also, a vapor delivery approach must be developed that is consistent with the standard MCVD setup.

Two separate delivery schemes were considered in the effort to introduce sodium into the silica glass network via MCVD. The local delivery system was initially explored as a simple method of introducing NaCl into the vapor stream. This dopant chamber delivery technique was originally developed by Poole, et al to incorporate small additions of rare earth dopants via chloride precursors [See Poole, et al., "Fabrication and Characterization of Low-Loss Optical Fibers Containing Rare Earth Ions," *Journal of Lightwave Technology,* V. LT-4, No. 7, pp. 870–875, 1986 and U.S. Pat. No. 4,787,927 to Mears et al.]

Figure 2:
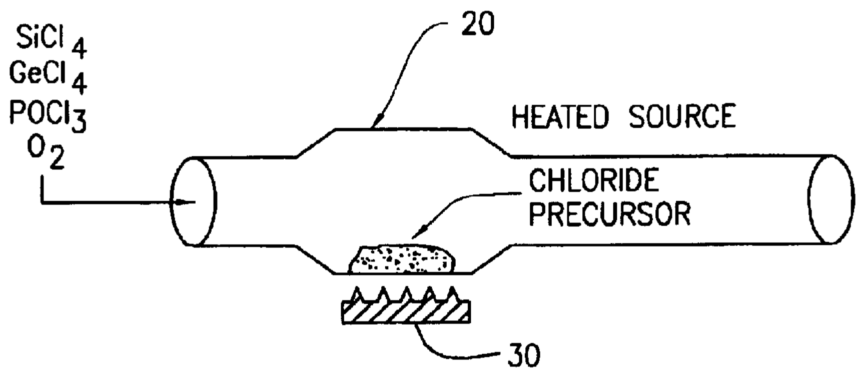
FIG. 2 provides a schematic depiction of a local delivery system for introducing a dopant into an MCVD vapor stream.

The inventors adapted this basic approach for delivery of NaCl into the vapor stream as shown in FIG. 2. The chloride precursor was contained in the dopant chamber 20 that was placed in-stream with the standard MCVD setup. The chloride was first heated by heater or torch 30 to its melting point, and then allowed to cool so that the material fused to the inner wall of the dopant chamber. The dopant chamber was then heated, producing NaCl vapor that combined with the $SiCl_4$, $GeCl_4$, $O_2$, He, etc. gases. Typical MCVD deposition was then performed downstream on a lathe.

Though an adequate vapor source was achieved with this approach, the final Na incorporation into consolidated preforms was less than desirable in virtually all the fabrication attempts. The inventors thus turned to a new delivery method—an organometallic delivery approach similar to the chelate apparatus developed by Snitzer, et al., in 1986. [14]

Figure 3:
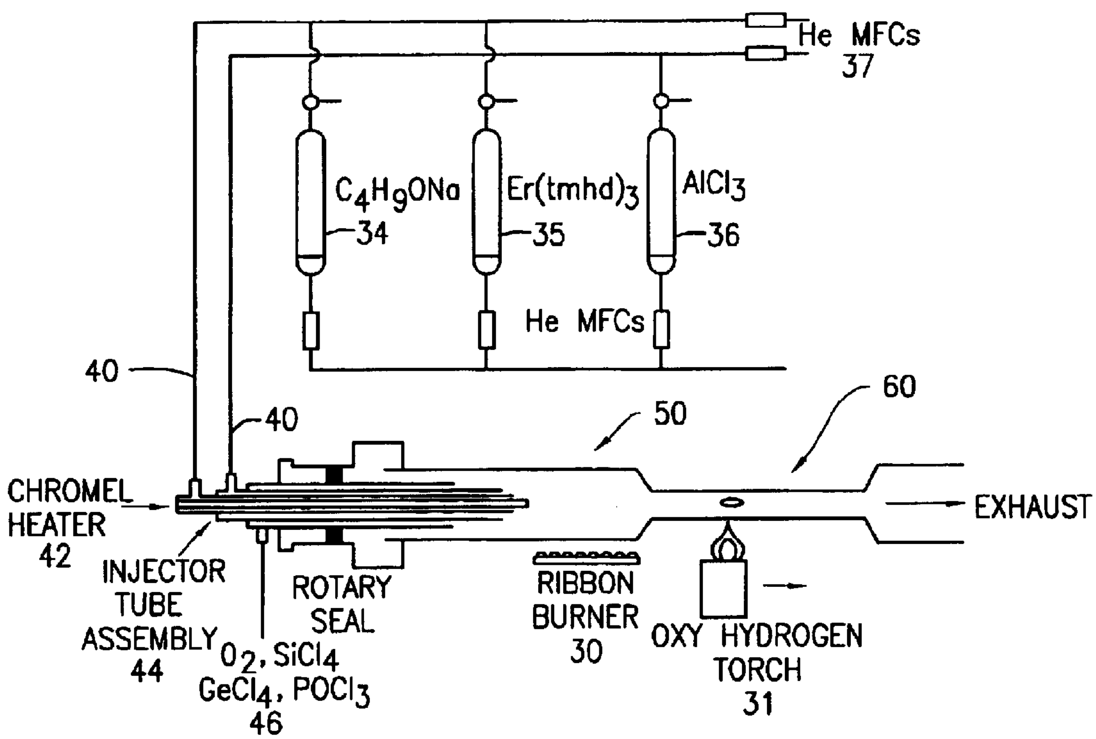
FIG. 3 provides a schematic depiction of an organometallic delivery approach for introducing a dopant into an MCVD vapor stream.

[See Tumminelli, R, McCollum, B and Snitzer, E, "Fabrication of High Concentration Rare-Earth Doped Optical Fibers Using Chelates," *Journal of Lightwave Technology,* V. 2, No. 11, pp. 1990–2001, 1990.] The components and flow arrangement of this latter method are illustrated in FIG. 3.

In this approach, the organometallic precursor chosen for sodium vapor delivery was sodium t-butoxide, $C_4H_9ONa$. The attractive nature of this compound is that an oxygen is initially attached to the sodium atom. The sodium t-butoxide sublimes at a temperature of 180° C./1 mm Hg. The sodium precursor 34 and the aluminum chloride 36 was heated to varying temperatures between 180–200° C. to achieve an adequate vapor source. The vapor was then transported via He mass flow controller 37 in teflon lines 40, heated at temperature ranging from 220–230° C. by chromel heater 42 as it passes through the injector tube assembly 44 positioned in the seal connected to the standard lathe setup 50. CVD precursors 46 are also introduced into an outer ring of the injector tube assembly 44. The $C_4H_9ONa$ plus He vapor is virtually separated from the other precursor vapors until deposition, as to eliminate any detrimental reactions with other gases before deposition. The vapors are heated by ribbon burner 30 and then pass into reaction zone 60 where they are heated by oxy-hydrogen torch 31.

The organometallic approach produced concentrations of Na in the fiber preforms that were believed adequate to produce an improved loss characteristic in fibers drawn from those preforms. However, sodium depletion was experienced during the preform collapse process that left insufficient Na concentration in the drawn fiber to produce the desired low-loss fiber. The inventors made numerous modifications in an effort to reduce the sodium depletion that occurred during the collapse process, including introduction of a silica barrier layer on the inner wall of the deposition tube, overdoping of NaCl and/or $C_4H_9ONa$ during the collapse process and the introduction of a pre-collapse process in which the cladded tube was collapsed to a smaller radius before the Na doped core was deposited. While some improvement was seen with the collapse modifications, none achieved the inventors' objective for producing low loss fiber.

It is to be noted that the control of the precursor gas flow and the ability to easily co-dope with aluminum made the organometallic delivery system attractive for the synthesis of Na—Al—Si glasses. Although the glasses fabricated via the MCVD process contained relatively low amounts of $Na_2O$ with varying levels of $Al_2O_3$ concentrations, it became apparent that the simultaneous co-doping with $Al_2O_3$ enhanced the retention of sodium.

It is also noteworthy that, while the current low sodium concentrations achieved via MCVD may not be adequate for the reduction of scattering losses in glass, the possible effects of co-doping with rare earth ions may be applicable at low concentrations. The low sodium concentrations appear to affect the structure of the glass, and thus may alter the shape and position of the absorption peaks of the rare earth ions. In accordance with the ligand theory, these absorption peaks yield information about the local structure of the ion. Thus, the co-doping of the rare earth ion is an indirect method of determining if sodium incorporation is achieved through the analysis of the change in shape and position of the rare earth absorption peaks. It was found by the inventors that even a low Na incorporation in the glass has a dramatic effect on the solubility of the Er ions, as an exemplary rare earth element.

To summarize with respect to Sodium Aluminosilicate Glasses, the fabrication of low content sodium silica preforms via the MCVD process was achieved by the inventors but the sodium levels were not high enough to significantly lower the fictive temperature of the glass, and thus lower the scattering loss. Minor additions of sodium, though, appear to increase the ability for incorporation of rare earth elements in MCVD glasses.

In furtherance of their objective for producing a low loss fiber, the inventors turned their focus to aluminosilicate glasses doped with alkaline earth elements, and particularly Ca. The methodology of that approach is described in the next section.

II. Calcium Aluminosilicate Glasses

Through analysis of the thermodynamic properties of sodium aluminosilicate and calcium aluminosilicate glasses, the inventors have determined that calcium is more stable than sodium in the chlorine atmosphere associated with the MCVD process. The saturated vapor pressures of calcium oxide are more similar to silica than the high vapor pressures of $Na_2O$, and CaO is much more stable at high temperatures. In addition, the potential of Ca—Al—Si glasses had previously been theoretically established by Lines et al., in "Calcium Aluminate Glasses as Potential Ultralow-Loss Optical Materials at 1.5–1.9 microns" in *Journal of Non-Crystalline Solids,* Vol. 107, pg. 251–260, 1989. With this perspective, the inventors undertook to develop a low loss fiber based on a calcium aluminosilicate glass composition, with the initial focus being a determination of an appropriate precursor and delivery method.

The initial calcium delivery approach considered by the inventors was the organometallic synthesis method. The method was analogous to the chelate delivery approach and the method considered with respect to sodium t-butoxide. The precursor material used in this process was Bis(2,2,6,6-tetramehtyl-3,5-heptanedionato) calcium, $Ca(C_{11}H_{19}O_2)_2$. This calcium precursor possessed adequate sublimation temperatures for the organometallic delivery system of 205° C./0.1 mm Hg. After experimental fabrication of a number of preforms at various processing temperatures of the calcium precursor, the inventors determined to use a temperature of 179° C.

Ultimately, the organometallic delivery approach yielded preforms with undesirably low calcium concentrations. The highest concentrations of calcium concentrations varied between 0.05–0.23 wt %. The low calcium concentrations were attributed to the relatively low vapor pressure of the $Ca[TMHD]_2$ precursor achieved in the fabrication process. It is noted, however, that, although the calcium dopant level was consistently low, the concentration profile was smooth in the core region of the preform. This initial organometallic precursor also has the drawback of introducing hydrogen into the soot, which requires the implementation of drying steps to achieve a low loss glass.

From that experience, the inventors pursued the dopant chamber delivery approach, using a calcium chloride dopant, in attempt to incorporate higher amounts of calcium. This local delivery approach is essentially similar to that described above in conjunction with discussion of Na doped glasses and depicted in FIG. 2. The calcium chloride precursor maintains adequate vapor pressures for MCVD delivery and has the advantage over the organometallic material in that it does not contain any hydrogen or oxygen. Thus, water contamination is drastically reduced in the precursor selection. In addition, the local delivery approach is contained within the lathe setup and thereby alleviates the possibility of impurity contamination, i.e. transition metals or water. A disadvantage of the local delivery approach is the lack of precise control for the delivery of $CaCl_2$ into the vapor stream.

Although the local delivery approach was successful in the incorporation of relatively large amounts of calcium, the concentration profile displayed a reduced amount of CaO in the center of the preforms. This phenomena is attributed by the inventors to a flow control deficiency in the local delivery approach. [It is noteworthy that, for preforms fabricated with the local delivery approach, the deposition temperature was drastically reduced with the addition of calcium—approximately 1550° C. as opposed to approximately 2000° C. for silica. The reduction in the glass deposition temperature is indicative of the fictive temperature.]

Figure 4:
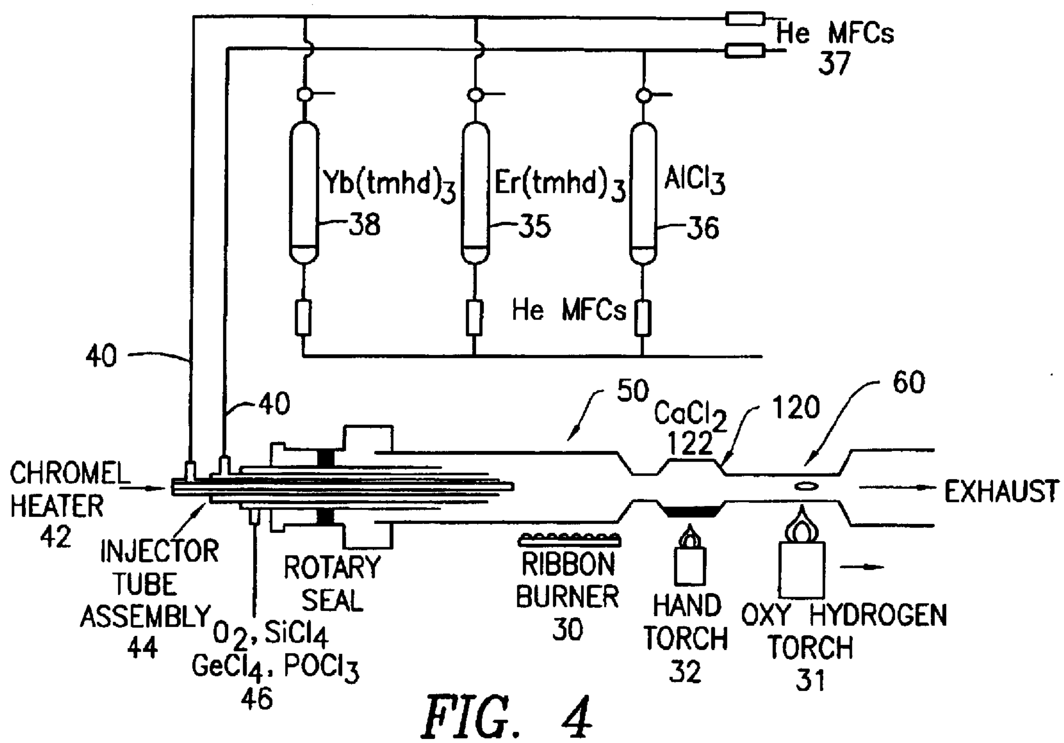
FIG. 4. provides a schematic depiction of a modified vapor delivery system according to the method of the invention.

Based on the experiences described above, the inventors developed a new MCVD delivery approach that combines the organometallic delivery method with the local delivery method. The $AlCl_3$ 36 is delivered via the typical chelate delivery approach, while the $CaCl_2$ is delivered simultaneously in the vapor stream using the local delivery approach. An apparatus for carrying out this methodology is schematically illustrated in FIG. 4. As can be seen in the figure, this delivery approach integrates the bubbler delivery of $AlCl_3$ and the local delivery of $CaCl_2$ 122. A local dopant chamber 120 is connected to the lathe 50. The dopant chamber 120 containing the $CaCl_2$ 122 is heated to approximately 1000–1500° C. by hand torch 32 to produce adequate vapor pressures. The vapors are then carried downstream to the reaction zone 60 typical in the MCVD process. A significant advantage of this approach is the direct heating of the $CaCl_2$ precursor to produce a high vapor flow. However, this approach also suffers the disadvantage of a lack of flow control, as well as unavoidable reactions that occur in the dopant chamber due to the premature mixing of the precursor gases and the comparatively poor cleanliness of the process.

Figure 5:
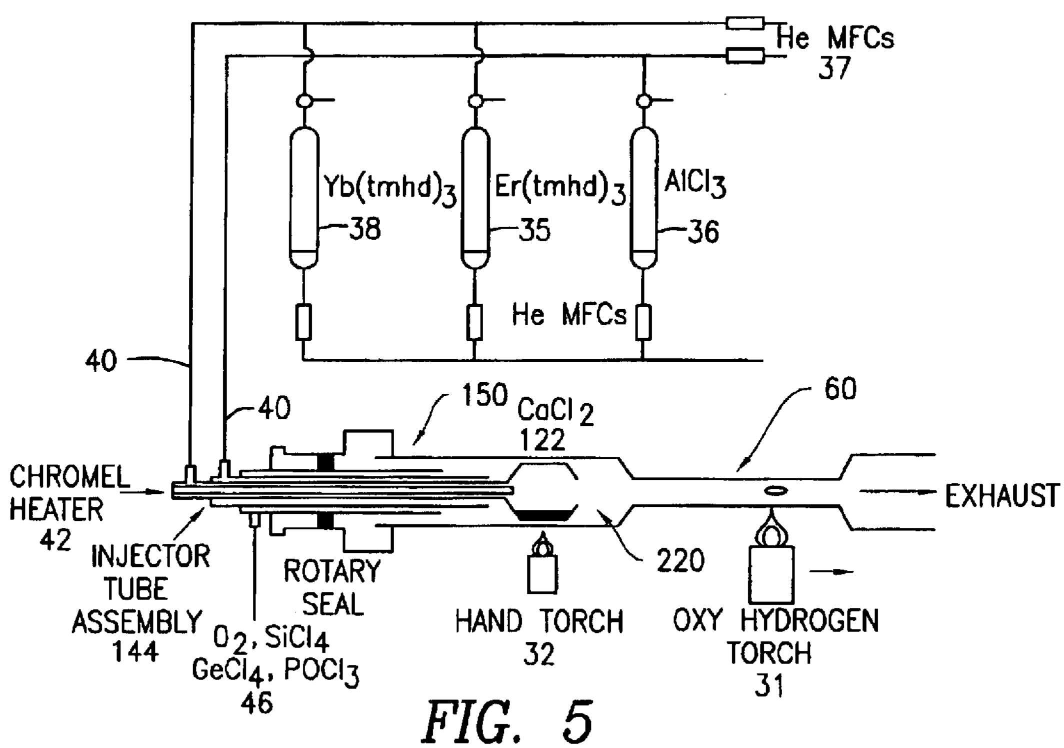
FIG. 5. provides a schematic depiction of a further modified vapor delivery system according to the method of the invention.

In an effort to improve upon the basic local delivery process of the methodology depicted in FIG. 4, the inventors developed a modification of this technique as illustrated in FIG. 5. In this configuration, a modification is made to the injection tube that is typically employed in the delivery of $AlCl_3$ and rare earth chelate compounds. A dopant chamber extension 220 was added to the end of the injection tube assembly 144 within lathe 150. Thus, the dopant chamber 220 is stationary in a rotary seal, and a controlled flow of helium is employed as the carrier gas for the $CaCl_2$ delivery. Unlike the local dopant chamber, the precursor gases are basically separated before the reaction zone. Either ytterbium 4*b*$(tmhd)_3$ 38 and Erbium $Er(tmhd)_3$ 35 or $AlCl_3$ 36 can be directed to the inner ring of injector tube assembly 144. The outer glass (OD=38 mm, ID=36 mm in a representative embodiment) surrounding the injection tube dopant chamber was "paddled down" to achieve adequate temperatures via hand torch heating. This processing modification allows for a more efficient deposition of Ca—Al—Si glass via the standard MCVD process. Dopant concentrations of preforms fabricated with the delivery apparatus of FIG. 5 were found to be comparable to dopant concentrations achieved by the apparatus of FIG. 4.

In the delivery approach shown in FIG. 5, the $CaCl_2$ chloride is separated from the other precursor vapors and processing gases. Thus, no premature mixing of the gases occurs during the synthesis of the preforms. The source of the $AlCl_3$ is a remote generator that is connected to the setup via heated teflon lines. The $AlCl_3$, $SiCl_4$, and $CaCl_2$ remain separated until the deposition zone downstream in the substrate tube. By this embodiment of the invention, the calcium chloride used can be in dependently controlled. This allows for varying the calcium aluminum ratio.

Additional processing modifications were also developed by the inventors in an effort to lower the attenuation of the "second generation" preforms. The dopant chloride was dried for approximately 30 minutes at a temperature of 800–1000° C. to remove the water impurities and fuse the material to the dopant chamber. A flow of 20 ml/min of $Cl_2$ was also used during preform collapse to reduce the water contamination.

While both anhydrous $CaCl_2$ at 97.5% purity and hydrated $CaCl_2$ with a purity of 99.999% were experimentally evaluated by the inventors in the fabrication of preforms according to the method of the invention, considerably better results were achieved with the use of anhydrous $CaCl_2$ at 99.99% purity. That form of the Ca dopant should accordingly be considered as the preferred embodiment for the invention.

As described more fully below, fibers drawn from preforms fabricated by the methodology described herein have demonstrated low scattering losses. It is believed by the inventors that the success of the method of their invention is attributable in part to the greater homogeneity of glass fabricated from their process, relative to the aluminum chloride/rare earth chloride complex considered in the prior art. (See, U.S. Pat. No. 4,666,247 to Machesney et.al).

Figure 6:
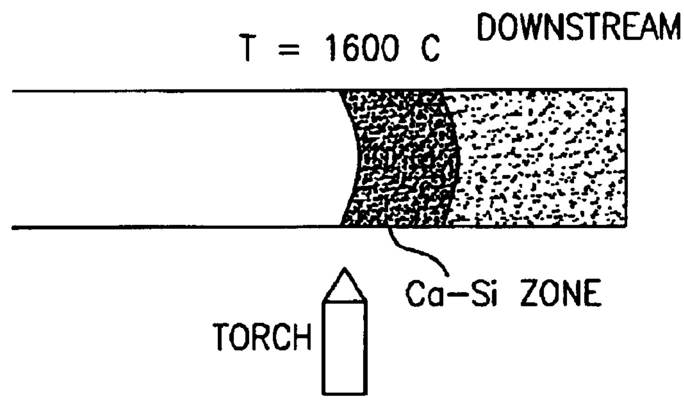
FIG. 6. illustrates the appearance Ca—Si deposition on the MCVD lathe using the methodology of the invention.

In an effort to develop a more precise control for the processing conditions of co-doping calcium and aluminum via MCVD, the inventors undertook to visually evaluate the deposition parameters. Typically silica glass is deposited at a temperature of 2100° C., while a P—F—Si clad glass is deposited at a temperature of 1950–2000° C. The devitrified Ca—Si glass is deposited at extremely low temperatures in the range of 1550–1600° C., which typically yields a soot for conventional glass compositions. The typical Ca—Si zone is illustrated schematically in FIG. 6.

Figure 7:
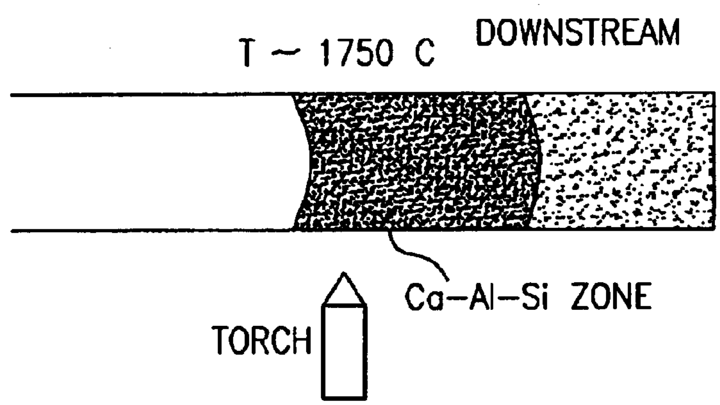
FIG. 7. illustrates the appearance of Ca—Al—Si deposition with Al/Ca>>2 using the methodology of the invention.

The deposition zones observed with the flows of $CaCl_2$ and $AlCl_3$ were noticeably different as seen visually on the lathe. The deposition temperatures were also slightly higher than the Ca—Si reaction. The typical deposition temperature of a glass with high aluminum flows occurred at temperature around 1750–1800 C., as illustrated in FIG. 7.

Figure 8:
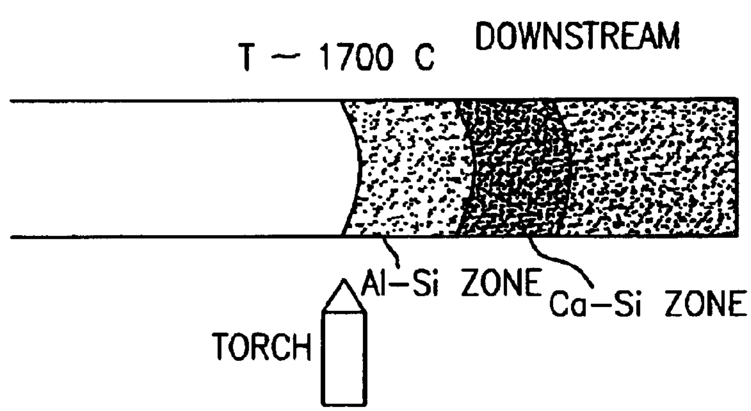
FIG. 8 illustrates the appearance of Ca—Al—Si glass with higher Ca/Al using the methodology of the invention.

The deposition of a Ca—Al—Si glass where the Ca/Al ratio is increased, the processing temperature is reduced and the deposition zone is altered is shown in FIG. 8. As the $CaCl_2$ was increased, the Ca—Si zone illustrated in FIG. 8 moves downstream and the zones separated at some critical value resulting in a devitrified glass where the maximum Ca/Al ratio is reached.

Because the equipment available to the inventors did not permit flow control in the calcium doping methodology of the invention to the desired degree, the evaluation of the deposition parameters described above was essential to the success of repeatable results. The lower processing temperatures of the Ca—Al—Si glass deposition is expected to be indicative of reduced fictive temperature.

The devitrification of Ca—Si glasses and Ca—Al—Si glasses is well understood and has been well documented in the art. However, the devitrification of MCVD Ca—Al—Si glasses does not appear to have been explored in publications. In preform fabrication, subtle changes in the Ca/Al ratio will result in the devitrification of the amorphous glass core. Such devitrification basically yields the preforms useless in fiber optic applications.

It is known that the inherent tendency of devitrification of Ca—Si glasses is greatly reduced by small additions of aluminum. The existence of metastable immiscibility, though, in the Ca—Al—Si system produces the possibility of devitrification in the Ca—Al—Si glasses, as well. Thus, a question exists as to the minimum Ca/Al ratio that must be achieved in order to develop a stable homogeneous amorphous glass. The incorporation of the appropriate concentrations is necessary both to maintain charge compensation and preserve the tetrahedral coordination of the network.

Figure 9:
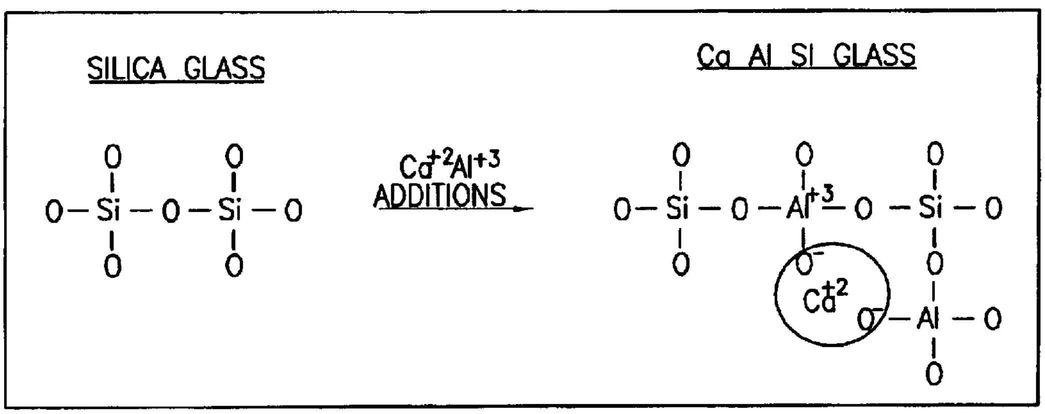
FIG. 9 schematically illustrates the Ca—Al—Si glass structure.

Basic glass science dictates that in order to preserve the tetrahedral glass system, a Ca/Al ratio of ½ must be achieved in structure. Charge compensation must be achieved to develop a stable glass system. The $Al^{+3}$ ion enters the glass network substitutionally for $Si^{+4}$ and acts a network former, while the $Ca^{+2}$ ion enters a modifier. Thus, charge compensation is achieved with the addition of 2 aluminum ions for one calcium ion, as seen in FIG. 9.

Realistically, homogenous glasses can be fabricated by fulfilling the following relationship.

$$3<(n_1M+n_2H)/H<20 \text{ preferably}<10$$

where M and H are the molar concentrations of the modifiers (Na, K, Ca, Mg, etc.) and homogenizers (Al, Ga, etc.), respectively, while $n_1$ and $n_2$ are the valences of the ions. Thus for the Ca—Al—Si glass system, the relationship is $$0<Ca/Al<17/2 \text{ preferably}<7/2$$

Accordingly, an objective of the inventors was the fabrication of preforms with Ca/Al ratios below the 7/2 ratio.

In the inventors' early work with the MCVD process, a P—F—Si cladding was typically deposited with the Ca—Al core co-doping resulting in a devitrification ring. Depositing a silica cladding instead of the P—F—Si matched cladding eliminated the devitrification at the core/clad interface. The devitrification was also successfully eliminated by depositing Al—Si barrier layers between the core and clad. The deposition of 2 barrier layers with a flow of 200 ml/min $AlCl_3$ has successfully eliminated the crystallization.

Figure 10:
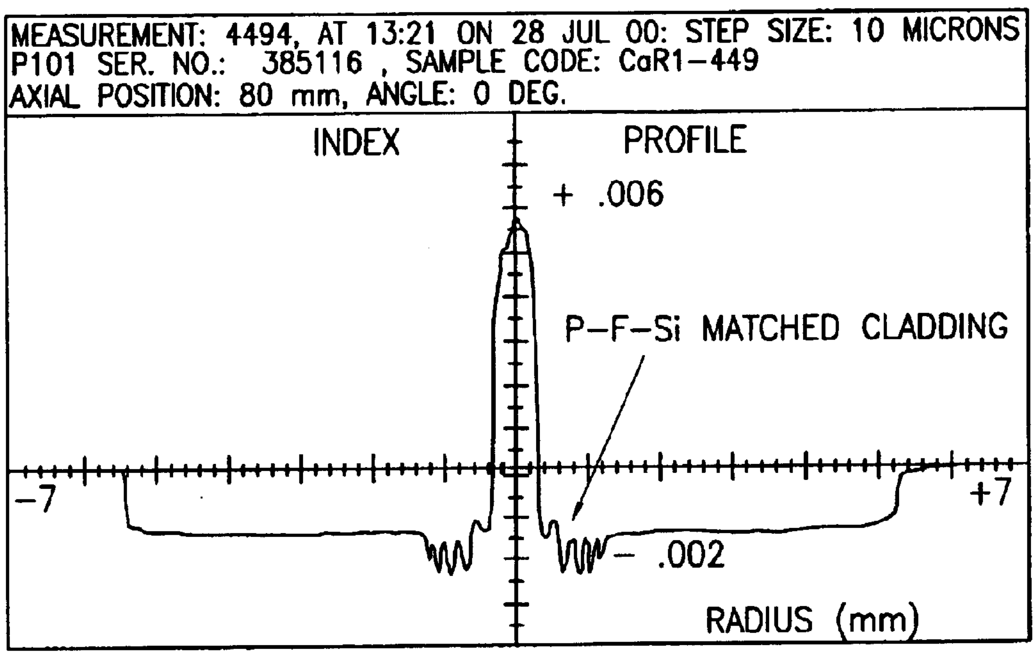
FIG. 10 shows the refractive index profile of a Ca—Al—Si preform fabricated according to the method of the invention, with P—F—Si matched cladding.
Figure 11:
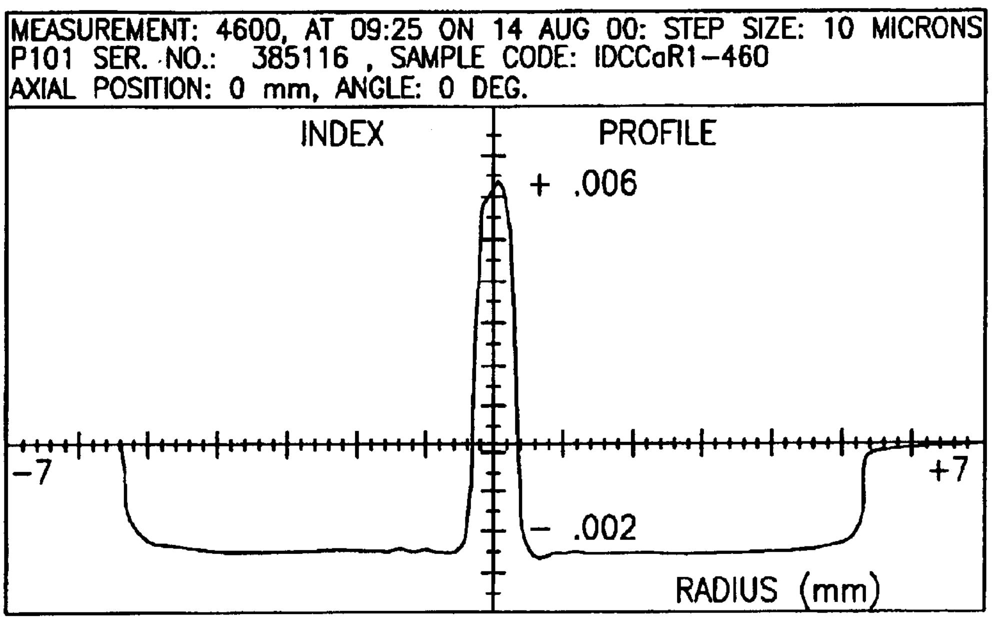
FIG. 11 shows the refractive index profile of a Ca—Al—Si preform fabricated according to the method of the invention, without P—F—Si matched cladding.

It is noted that the measurement of the refractive index profile (RIP) of finished preforms is one of the most important diagnostic techniques for preform evaluation. The refractive index profile of the Ca—Al—Si core glass lacks the index dip as seen in Ge—Si glass because CaO and $Al_2O_3$ are both thermodynamically stable at elevated temperatures as can be seen in FIGS. 10 and 11, showing, respectively, the refractive index profile of a Ca—Al—Si preform fabricated according to the method of the invention, with and without P—F—Si matched cladding. The difference in the preforms fabricated with the standard P—F—Si cladding and the preforms with the Si cladding becomes apparent in the RIP. The preforms fabricated with a P—F—Si cladding have "rippled" glass layers on both sides of the core glass, while the cladding in the Si cladded glass do not have discernable layers outside of the core as seen in FIGS. 10 and 11, respectively.

The addition of both aluminum and calcium to the silica core glass increase the refractive index. Since there is little teaching in the art on the refractive indices of low Ca—Al doped silica glass, the inventors have developed a relationship between the calcium and aluminum concentrations and the index difference between the core and clad. Typically, calcium has a greater effect on the increase in index than aluminum. Thus, more emphasis was placed on the CaO concentration in developing the correlation. The following trend was developed, $$n_{core}-n_{clad}\alpha(CaO+Al_2O_3)*CaO[\text{wt }\%]$$

Figure 12:
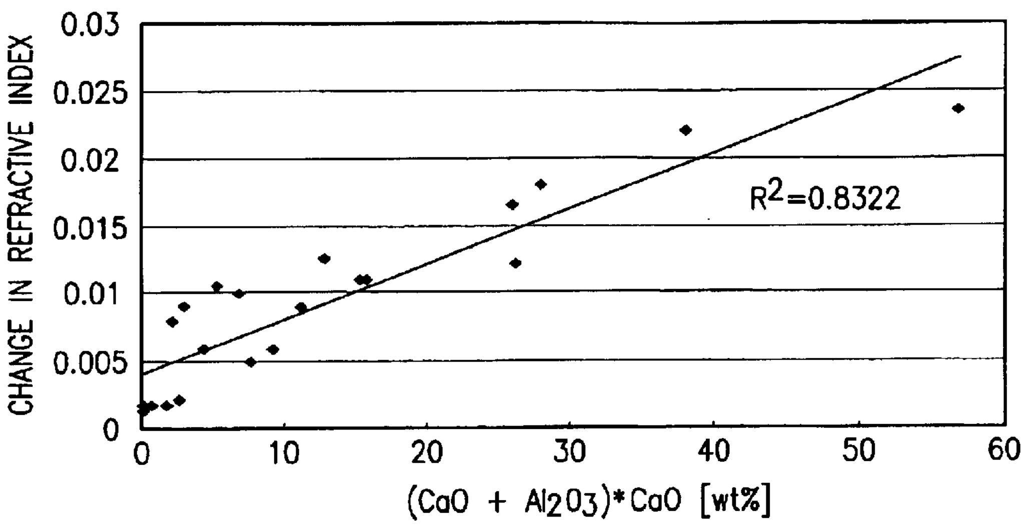
FIG. 12 shows a curve of the relationship between the index of refraction and CaO & $Al_2O_3$ concentrations for a preform fabricated according to the method of the invention.

Though not a direct relationship (i.e., $R^2=0.8322$), a trend has been developed as a tool to quickly recognize successfully fabricated preforms, as seen in FIG. 12.

Using the heretofore described preform fabrication methodology of the invention, along with the described supporting theses, a number of preforms of a variety of compositions were fabricated by the inventors in an attempt to identify the optimum composition for a glass possessing lower scattering losses than silica. The fiberization of selected preforms was performed using the Draw Tower at Rutgers University, using known draw tower methods. Attenuation measurements on the drawn fiber were done with the Photon Kinetics 2210 Fiber Analyzer at Rutgers University. The attenuation was found to track the scattering loss values obtained by Corning Inc. on the same samples (as described below). As explained earlier, lower attenuation is indicative of lower scattering. The scattering losses of three samples were measured by Corning Inc., which has provided technical assistance to the inventors, including providing evaluation services using equipment superior in accuracy to that available to the inventors at their laboratory. Those scattering loss measurements made by Corning were made relative to Corning's single mode fiber (designated smf-28 herein). The scattering loss of a "first generation fiber", which has been designated IDCCaAl-463 by the inventors, was found to be 1.3 times that of smf-28, while a standard germanium doped fiber fabricated at the inventors' laboratory was measured at 1.1 times that of smf-28. These higher scattering losses were expected because of the relatively crude MCVD processing techniques available at the inventors' laboratory for fabrication of these preforms.

The added processing steps in the "second generation" preforms were, however, found to improve the optical properties of the glass fibers. With this significant milestone in the development of the low loss glass composition, the inventors have subsequently fabricated a number of preforms with the same processing methodology as IDCCaAl-489, and corresponding to the method of the invention as described hereinabove, with the goal of producing fiber samples with an array of compositions. Relevant parameters for an exemplary set of such additional fibers are shown in Table 1. As of the filing date of this application, the inventors have not received the scattering loss values for these fibers as measured by Corning, but it is apparent from the attenuation values that these fibers will posses lower scattering losses than silica.

TABLE I

Selected Optical Fibers

| Preform | Core/Clad Diameter (μm) | N.A. | Min. Attenuation (dB/km) |
|---|---|---|---|
| IDCCaAl-494 | 7.05/124.1 | 0.1488 | 9.8 |
| IDCCaAl-496 | 4.7/128 | 0.0944 | 12.1 |
| IDCCaAl-504 | 12.2/126.6 | 0.1835 | 12.4 |
| IDCCaAl-507 | 10.29/130.6 | 0.1630 | 7.5 |
| IDCCaAl-510 | 9.13/125.1 | 0.2142 | 6.9 |
| IDCCaAl-515 | 7.5/125.8 | 0.1143 | 7.5 |
| IDCCaAl-515i | 7.5/125.8 | 0.1143 | 7.5 |

Figure 13:
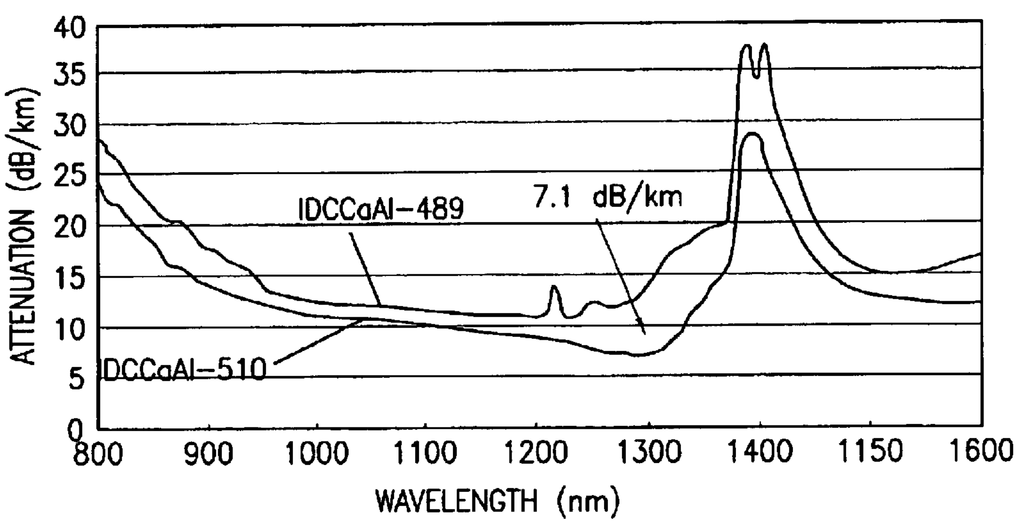
FIG. 13. shows attenuation curves for two fibers fabricated according to the method of the invention.

As shown in FIG. 13, IDCaAl-510 has a lower attenuation than IDCCaAl-489. Samples IDCCaAl-494, 507, and 515 also maintain lower attenuation values than IDCCaAl-489. As the attenuation of the multicomponent fibers continues to decrease with subsequent fabrication attempts and state of the art equipment, a still further reduction of scattering losses seems inevitable.

A methodology for fabrication of Ca—Si and Ca—Al—Si glasses via the MCVD process has been demonstrated and disclosed by the inventors. Calcium doped silicate samples have been synthesized with calcium oxide levels as high as 7.13 wt %. The inventors have invented a delivery system to incorporate calcium and aluminum into the silica preforms simultaneously by combining existing technologies. The deposition temperatures of glasses fabricated by the method of the invention are considerably lower than that of silica, correlating with lower fictive temperatures for these glass compositions. These glass compositions have a lower intrinsic Rayleigh scattering loss than silica.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention and is not intended to illustrate all possible forms thereof. It is also understood that the words used are words of description, rather that limitation, and that details of the structure may be varied substantially without departing from the spirit of the invention and the exclusive use of all modifications which come within the scope of the appended claims is reserved.

What is claimed is:

1. A fiber optic cable comprising:

a cladding; and a glass core positioned within the cladding, the glass core comprising silica doped with an alkali element and with aluminum;

wherein the core is formed by a Modified Chemical Vapor Deposition process implemented in an apparatus combining an organometallic synthesis methodology with a local doping chamber delivery methodology.

2. The fiber optic cable of claim 1, wherein the alkali element comprises sodium.

3. A fiber optic cable comprising:

a cladding; and a glass core positioned within the cladding, the glass core comprising silica doped with an alkali element and with aluminum;

wherein the glass core is co-doped with a rare earth metal.

4. The fiber optic cable of claim 3, wherein the rare earth metals comprises erbium.

5. The fiber optic cable of claim 3, wherein the rare earth metal comprises ytterbium.

6. The fiber optic cable of claim 3, wherein the rare earth metal comprises both erbium and ytterbium.

7. A fiber optic cable comprising:

a cladding; and a glass core positioned within the cladding, the glass core comprising silica doped with an alkali element and with aluminum;

wherein the glass core comprises Ca—Si glass.

8. A fiber optic cable comprising:

a cladding; and a glass core positioned within the cladding, the glass core comprising silica doped with an alkali element and with aluminum;

wherein the glass core comprises a Ca—Al—Si glass.

9. A fiber optic cable comprising:

a cladding; and a glass core positioned within the cladding, the glass core comprising silica doped with an alkali element and with aluminum;

wherein the glass core is formed with CVD precursors.

10. The fiber optic cable of claim 9, wherein the CVD precursors comprise $O_2$, $Si_2$, $GeCl_4$ and $POCl_3$.

11. A fiber optic cable comprising:

a cladding; and a glass core positioned within the cladding, the glass core comprising silica doped with an alkali element and with aluminum;

wherein the glass core is formed with $AlCl_3$.

12. A fiber optic cable comprising:

a cladding; and a glass core positioned within the cladding, the glass core comprising silica doped with an alkaline earth element and with aluminum;

wherein the glass core is co-doped with a rare earth metal.

13. The fiber optic cable of claim 12, wherein the rare earth metal comprises erbium.

14. The fiber optic cable of claim 12, wherein the rare earth metal comprises ytterbium.

15. The fiber optic cable of claim 12, wherein the rare earth metal comprises both erbium and ytterbium.

16. A fiber optic cable comprising:

a cladding; and a glass core positioned within the cladding, the glass core comprising silica doped with an alkaline earth element and with aluminum;

wherein the glass core is formed with CVD precursors.

17. The fiber optic cable of claim 16, wherein the CVD precursors comprise $O_2$, $Si_2$, $GeCl_4$, and $POCl_3$.

18. A fiber optic cable comprising:

a cladding; and a glass core positioned within the cladding, the glass core comprising silica doped with an alkaline earth element and with aluminum;

wherein the glass core is formed with $AlCl_3$.

* * * * *

UNITED STATES PATENT AND TRADEMARK OFFICE

CERTIFICATE OF CORRECTION

PATENT NO. : 6,970,630 B2

APPLICATION NO. : 10/154572
DATED : November 29, 2005
INVENTOR(S) : George H. Sigel and Daniel S. Homa It is certified that error appears in the above-identified patent and that said Letters Patent is hereby corrected as shown below:

In accordance with the Examiner's Amendment of October 13, 2005, Claims 1 and 2 should read as follows:

Col 11, Line 21 should read
--Claim 1. A method of forming a fiber optic cable comprising a cladding and a glass core positioned within the cladding, the glass core comprising silica doped with an alkali element and with aluminum; wherein the core is formed by a Modified Chemical Vapor deposition process implemented in an apparatus combining an organometallic synthesis methodology with a local doping chamber delivery method.--

Col 11, Line 32 should read
--Claim 2. The method of Claim 1, wherein the alkali element comprises sodium.--

The chemical element Si2 in Claims 10 and 17 should read --$SiCl_4$.--

Col 12, Line 14 should read
--Claim 10. The fiber optic cable of claim 9, wherein the CVD precursors comprise $O_2$, $SiCl_4$, $GeCl_4$ and $POCl_3$.--

Col 12, Line 42 should read
--Claim 17. The fiber optic cable of claim 16, wherein the CVD precursors comprise $O_2$, $SiCl_4$, $GeCl_4$ and $POCl_3$.--

Signed and Sealed this

Second Day of October, 2007

JON W. DUDAS
*Director of the United States Patent and Trademark Office*

UNITED STATES PATENT AND TRADEMARK OFFICE

CERTIFICATE OF CORRECTION

PATENT NO. : 6,970,630 B2
APPLICATION NO. : 10/154572
DATED : November 29, 2005
INVENTOR(S) : George H. Sigel, Jr. and Daniel S. Homa It is certified that error appears in the above-identified patent and that said Letters Patent is hereby corrected as shown below:

Col. 11, line 21 should read

-- Claim 1. A method of forming a fiber optic cable comprising a cladding and a glass core positioned within the cladding, the glass core comprising silica doped with an alkali element and with aluminum; wherein the core is formed by a Modified Chemical Vapor deposition process implemented in an apparatus combining an organometallic synthesis methodology with a local doping chamber delivery method.--

Col. 11, line 32 should read

--Claim 2. The method of Claim 1, wherein the alkali element comprises sodium.--

The chemical element “Si2” in Claims 10 and 17 should read --$SiCl_4$--.

Col. 12, line 14 should read

--Claim 10. The fiber optic cable of claim 9, wherein the CVD precursors comprise $O_2$, $SiCl_4$, $GeCl_4$ and $POCl_3$.--

Col. 12, line 42 should read

--Claim 17. The fiber optic cable of claim 16, wherein the CVD precursors comprise $O_2$, $SiCl_4$, $GeCl_4$ and $POCl_3$.--

Signed and Sealed this

Sixteenth Day of October, 2007

JON W. DUDAS

*Director of the United States Patent and Trademark Office*